(12) United States Patent
Grodsky et al.

(10) Patent No.: US 12,466,758 B1
(45) Date of Patent: Nov. 11, 2025

(54) FUSED MATERIALS WITH MISMATCHED PROPERTIES

(71) Applicant: Honeywell Federal Manufacturing & Technologies, LLC, Kansas City, MO (US)

(72) Inventors: Rachel Leigh Grodsky, Raymore, MO (US); Noah Michael Weyrauch, Lee's Summit, MO (US); Richard K. Brow, Rolla, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 19/023,212

(22) Filed: Jan. 15, 2025

(51) Int. Cl.
    *C03B 37/012*      (2006.01)
    *C03B 37/027*      (2006.01)
    *C03C 27/02*      (2006.01)

(52) U.S. Cl.
CPC .. *C03B 37/01222* (2013.01); *C03B 37/02727* (2013.01); *C03C 27/02* (2013.01)

(58) Field of Classification Search
None
See application file for complete search history.

(56) References Cited

U.S. PATENT DOCUMENTS

| | | | |
|---|---|---|---|
| 3,598,556 A * | 8/1971 | Hunt | C03C 27/02 65/59.25 |
| 5,709,724 A | 1/1998 | Naugler et al. | |
| 10,407,337 B2 | 9/2019 | Boughton et al. | |
| 10,544,058 B1 | 1/2020 | Ewsuk | |
| 10,838,140 B2 | 11/2020 | Li et al. | |
| 2006/0191295 A1* | 8/2006 | Dowd | C03B 37/01217 65/412 |
| 2011/0268399 A1* | 11/2011 | Berkey | C03B 37/01217 385/107 |
| 2021/0317028 A1 | 10/2021 | Cimo et al. | |

(Continued)

FOREIGN PATENT DOCUMENTS

| | | | | |
|---|---|---|---|---|
| CN | 107062654 A | * | 8/2017 | |
| JP | 09030823 A | * | 2/1997 | C03B 37/01217 |

(Continued)

OTHER PUBLICATIONS

JP-09030823-A EPO Machine Translation retrieved Mar. 26, 2025. (Year: 2025).*

(Continued)

*Primary Examiner* — Lisa L Herring
(74) *Attorney, Agent, or Firm* — Erise IP, P.A.

(57) ABSTRACT

Systems and methods for creating glass and ceramic fibers comprising mixed properties are disclosed. In some embodiments, a first material and a second material are fused in a cane drawing process to generate fibers. The first material and the second material may comprise different coefficient of thermal expansion (CTE) properties. Upon heating and/or cooling the fused material, a first portion and a second portion of the fused material expand/contract at different rates generating/relieving stresses in the fused material. Furthermore, the first portion and second portion may be provided in contact with, or bonded to, various metals or other materials to produce hermetic seals.

20 Claims, 5 Drawing Sheets

(56) References Cited

U.S. PATENT DOCUMENTS

2022/0388903 A1   12/2022   Sirtl et al.

FOREIGN PATENT DOCUMENTS

JP          2003048739 A   *   2/2003   ....... C03B 37/02727
JP          2003089539 A   *   3/2003   ....... C03B 37/01217

OTHER PUBLICATIONS

JP-2003089539-A EPO Machine Translation Retrieved Mar. 26, 2025. (Year: 2025).*
JP-2003048739-A EPO Machine Translation Retrieved Mar. 31, 2025. (Year: 2025).*
CN-107062654-A Clarivate Analytics Machine Translation retrieved Mar. 31, 2025. (Year: 2025).*
Alexander Veber, et al., Nano-Structured Optical Fibers Made of Glass—Ceramics, and Phase Separated and Metallic Particle-Containing Glasses, Research Gate, MDPI, Fibers 2019, 7, 105; doi: 10.3390/fib7120105, www.mdpi.com/journal/fibers.

* cited by examiner

US 12,466,758 B1

FUSED MATERIALS WITH MISMATCHED PROPERTIES

STATEMENT OF GOVERNMENT SUPPORT

This invention was made with Government support under Contract No.: DE-NA-0002839 awarded by the United States Department of Energy/National Nuclear Security Administration. The Government has certain rights in the invention.

BACKGROUND

1. Field

Embodiments of the current disclosure relate to methods of creating glass fibers comprising mixed properties and cane fiber drawing and fabrication methods.

2. Related Art

Glass and ceramic canes and fibers are used in many industries for the strength, moldability and non-conductive properties of the materials. The canes and fibers are typically formed by creating preforms from materials and then heating the preforms in a furnace. Once the preforms have reached a melting point, the material can be drawn or extruded into a fiber or cane, depending on the intended use. The preforms used in creating the fiber and cane may be preprocessed to include desired properties. As such, various formulae for the glass or ceramic may be mixed to obtain the desired properties before melting and drawing the canes and fibers.

Typically, drawing processes may be utilized in creating rods or "canes." This process includes using a furnace, or some other heating method, to heat a material to, or near, its melting point. When the material melts, pressure may be added from the first side, and the cane/fiber may be drawn from the second side. A small diameter cane/fiber of the material is created and ready for use once cooled. This method is typical in creating glass/ceramic/glass ceramic rods and fiber optics.

What is needed are systems and methods of creating canes/fibers for various industry while precisely controlling properties thereof and, furthermore, providing various regions of the canes/fibers comprising different properties for affixing to other materials.

SUMMARY

Embodiments of the current disclosure solve the above-described problems and provide a distinct advance in the art by providing glass fibers with a range of properties.

An embodiment of the current disclosure relates to method of creating a fused material with a coefficient of thermal expansion (CTE) functional gradient. The method comprises providing a first material and a second material, wherein the first material comprises a first coefficient of thermal expansion (CTE) and the second material comprises a second CTE and the first CTE is distinct from the second CTE, adding heat to the first material and the second material to fuse the first material to the second material and drawing the first material and the second material into the fused material, wherein the fused material comprises a first portion CTE, and a second portion comprises a second portion CTE.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
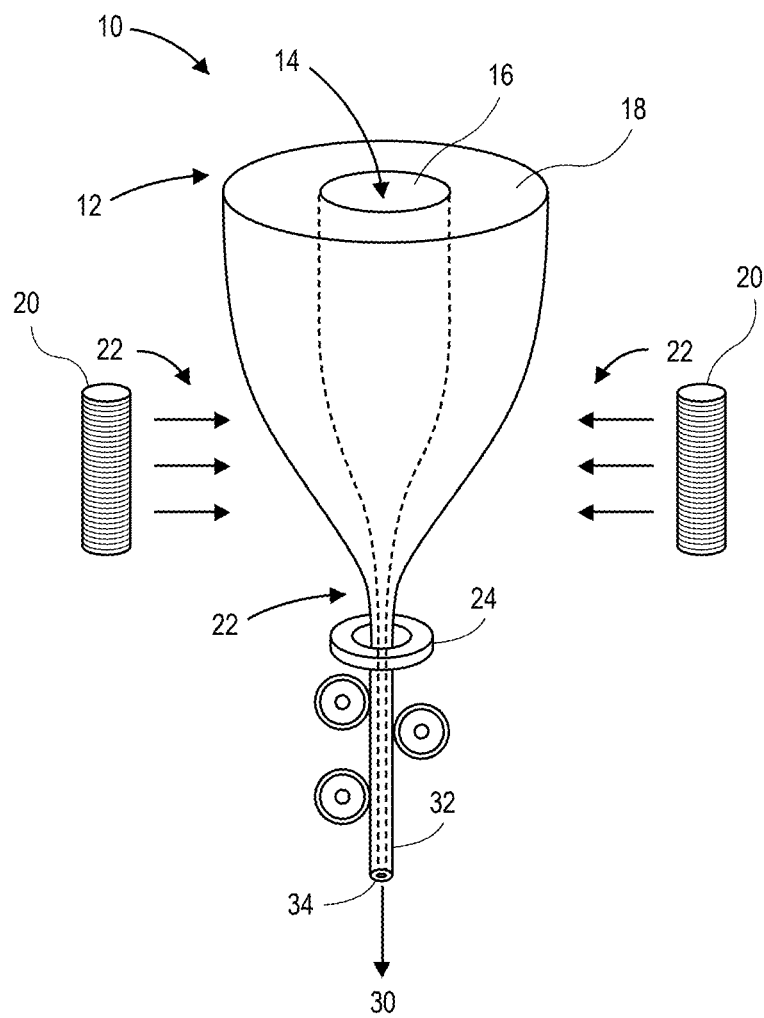
FIG. 1 depicts an exemplary fiber/cane drawing system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the current disclosure provide processes for creating fused materials (e.g., canes and fibers) for various applications. The fused materials may be created by drawing to generate tubes, rods, seal components, fiber optics, and the like. In some embodiments, fused materials may be preforms and may be generated to control internal stresses when multiple different materials are required to be in contact or even fused, in some embodiments. For example, the preforms generated here may be used in airtight hermetic seals and may utilize glass, ceramic, glass ceramic, or other materials for various purposes in the seals. These materials may be in contact with other materials such as, for example, metal that causes additional stresses and sealing issues. For example, glass, ceramic, glass ceramic, or other non-conductive materials may be provided as airtight, watertight, and/or conductive/nonconductive elements of the seal. In another example, the glass, glass ceramic, or ceramic materials may be formed to provide a force to, or resist a force from, various combinations of materials (e.g., rubber, metal, and the like), resolving issues that arise with these multi-material components. In some embodiments, controlling the forces with the preforms can maintain the airtight seal and control the forces within the various materials and components of the seals to prevent breaking and increase the life of the components. In some embodiments, rates of thermal expansion of the materials may be strictly controlled to control the forces within the preforms and finally the seals when heat is applied or extracted. In some embodiments, the materials may be in contact with other materials such as, for example, metal that will join with one glass composition, and degrades when joined with another. As such, in an exemplary hermetic seal, an outer material may be selected for compatibility with a shell of the hermetic seal and an inner material may be selected for compatibility with a metal tube of the hermetic seal.

FIG. 1 depicts one example of drawing system 10 for fibers. In some embodiments, material such as glass ceramic or glass ceramic is fed into furnace 20 where heat is provided to bring the materials to, or near, the melting point of the material. When the material is softened, it can be drawn into long tubes or rods called canes and fibers. The material used in the process described herein can be any of typical glass and/or ceramic materials such as, for example, fused silica, borosilicate glass, alumino-borosilicate glass, A-glass (alkali-lime glass, little-to-no boron), E-CR-glass (Electrical/Chemical Resistance), C-glass (alkali-lime with high boron content), and any other silica-based formulation. Similarly, glass ceramics of various formulations may be used in the cane-pulling process. It should be noted that, though glass is generally referenced as the material in examples herein, ceramics, metals, composites, and any other material that may be processed in drawing system 10 may be compatible with the processes described herein.

FIG. 1 depicts drawing system 10 comprising two materials, first material 16 and second material 18, mechanically combined as preform 12. Here, preform 12 comprises mechanically coupled or, in some embodiments, non-coupled materials in a pre-cane/fiber forming process. As depicted, first material 16 has been inserted into second material 18, thereby forming the preform 12 prior to the drawing process shown. In some embodiments, two materials may be combined; however, one, two, three, or many more materials may be provided in various arrangements. Exemplary arrangements of the materials (after the drawing process) are shown in FIGS. 2A-2G. In some embodiments, the materials may be any combination of the above-described materials including any combination of glass, ceramic, glass ceramic, metal, or the like. In the embodiments described herein and in general practice, the materials may be the same, or nearly the same formula, with some slight differences. For example, as described below, materials may be pre- or post-processed differently to provide the same type of material but with different properties (e.g., coefficient of thermal expansion (CTE), material compatibility, transmission, reflection, and the like).

In some embodiments, prior to the drawing process various materials may be processed. The materials may be created by standard processes to make any shape permitted by the pulling process. Here, for exemplary purposes, first material 16 and second material 18 will be used. Furthermore, as a non-limiting example, non-conductive glass will be used as the material of second material 18 and first material 16. In this example, second material 18 and first material 16 may be combined to create useful properties for components used in manufacturing. The combination of second material 18 and first material 16 may result in components that may be used in, for example, manufacturing of hermetic seals, as shown in FIG. 2G and creating fiber optics. These use cases are exemplary, and it should be imagined that these components could be used in any industry that may utilize glass, glass-ceramic, and ceramic fibers.

First material 16 and second material 18 may be created with various beneficial properties. Continuing with the above example, second material 18 and first material 16 may be processed with glass comprising slightly different properties such that, when the glasses are combined, predictable stresses may be generated between first material 16 and second material 18, or varying properties provide different exposure to the outside of second material 18 than the inside of first material 16. As such, second material 18 and first material 16 may provide various functions in various industrial fields, as described below.

Prior to insertion of the preform 12 into drawing system 10, first material 16 and second material 18 may undergo certain processes to generate the various desired properties in cane/fiber 32. Continuing from here, cane/fiber 32 will be referred to as fiber 32, though it should be realized that fiber 32 may, in some embodiments, also be a cane. Furthermore, in some embodiments, first material 16 and second material 18 may be fused to generate any geometry permitted by the pulling process. Fiber 32 is used here as any geometry, though in most cases, the geometry and material will be a glass fiber or cane. It may be beneficial to provide first material 16 and second material 18 with different properties; as such, it can be imagined that all properties described herein may apply to either of first material 16 or second material 18 or both of first material 16 and second material 18 as desired based on the final purpose of fiber 32. As such, manipulation of various properties of first material 16 and second material 18 may be performed before mechanically coupling first material 16 to second material 18 to create preform 12. For example, the materials may include different formulae. This makes the material different and, therefore, may provide different conductive, strength, thermal, chemical properties, and the like. In some embodiments, first material 16 and second material 18 may comprise the same formula but may be processed chemically and/or mechanically to include different properties by annealing, and the like. As such, various properties and stresses may be included in fiber 32 once first material 16 and second material 18 are fused.

In some embodiments, first material 16 may be inserted into second material 18 and fed into furnace 20 and, in some embodiments, pressurized air 14 may be added through a center hole of the tube to precisely control the geometry of the center hole during melting and drawing, if a center hole is created during this process. As first material 16 and second material 18 are fed into furnace 20, heat 22 may be added. Heat 22 may cause first material 16 and second material 18 to begin to melt becoming malleable such that second material 18 and first material 16 may combine, or fuse shaping fiber 32. As second material 18 and first material 16 are drawn and shaped into fiber 32, the surface of fiber 32 may be treated by surface-coating device 24. In some embodiments, a surface coating may be applied to fiber 32 depending on the particular use case of fiber 32. For example, the coating may repel water, oil, or the like or may provide additional non-conductive or conductive properties. Any coating may be added depending on the intended use of fiber 32.

As first material 16 and second material 18 are heated and fused together at boundary 34, fiber 32 may be generated while maintaining the properties of first material 16 and second material 18. In some embodiments, further desired properties may be introduced to the materials based on the heating and drawing of the materials. When the materials cool and fiber 32 is created, fiber 32 now includes various regions of differing properties, as shown in FIGS. 2A-2F.

FIGS. 2A-2F depict exemplary configurations of fiber 32. In some embodiments, as described above, fiber 32 may be configured with various materials or various properties for each region of fiber 32. Here, first material 16 may be combined with second material 18 in the above-described drawing process. As described above in reference to second material 18 and first material 16, first material 16 and second material 18 may be different materials, similar materials, or the same materials with different properties. Here, first material 16 may be glass, and second material 18 may be glass with a different coefficient of thermal expansion (CTE). The glass material is exemplary and any glass, ceramic, and/or glass ceramic, may be used.

Figure 2A:
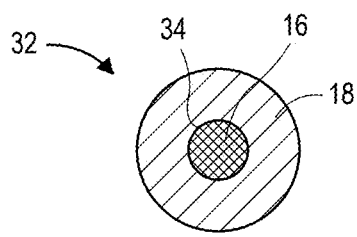
FIGS. 2A-2C depict exemplary embodiments of fiber cross-sections drawn with varying coefficient of thermal expansions (CTE)

FIG. 2A depicts fiber 32 comprising first material 16, second material 18, and boundary 34. In some embodiments, boundary 34 may be a transition between first material 16 and second material 18 formed by the drawing process described above. In some embodiments, boundary 34 may comprise a slim region that comprises a mixture of first material 16 with second material 18. As such, any differences in properties of first material 16 and second material 18 may interact along boundary 34. In some embodiments, boundary 34 may comprise a material characteristic gradient from first material 16 to second material 18 as described in more detail below. Furthermore, fiber 32 may form a functional gradient as an outer edge of fiber 32 and an inner portion of fiber 32 have a different CTE. The difference between the outer CTE and the inner CTE may be referenced in embodiments herein as a "functional gradient."

Continuing with the embodiment illustrated in FIG. 2A, fiber 32 comprises first material 16 disposed internally to second material 18 in a coaxial arrangement in the cross-section view. This configuration may have been generated by the drawing process in FIG. 1. Here, fiber 32 comprises a solid material cross-section with various coaxial layers, and not coaxial in some embodiment, which may be useful in various industries such as fiber optics, woven and unwoven composite materials, strength in seals for conductive/nonconductive products and reactive/nonreactive products and hydrophobic/hydrophilic seals. Ceramic and glass are often used for many industrial products based on their heat, strength, conductive, and reactive properties. Though several use cases (e.g., fiber optics and hermetic seals) are provided herein, any industry products and processes may be imagined for use with the ceramic and glass fibers described herein.

Figure 2B:
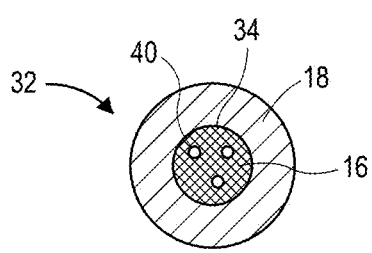

FIG. 2B depicts an embodiment of fiber 32, which may comprise core 40, or a plurality of cores as shown. Core 40, in some embodiments, may be formed by drilling the embodiment in FIG. 2A. As such, core 40 may simply be a pinhole through which a conductor, a tube, or other component may be inserted. In some embodiments, core 40 (e.g., a pinhole) may be formed by adding pressurized air during the drawing process of FIG. 1. The pressurized air 14 may prevent the collapse of first material 16 while in a malleable state, resulting in the desired form of core 40. When core 40 is a plurality of cores, each core may be formed simultaneously as fiber is drawn in the above-described drawing process to form each core 40 of the plurality of cores. Alternatively, each core 40 of the plurality of cores may be drilled. In the embodiments where core 40 is a through hole, core 40 may be used as a hermetic seal insert, as shown in FIG. 2G.

In some embodiments, first material 16 and second material 18 may be combined to produce fiber optics utilizing core and cladding techniques. Here, first material 16 may be the core, and boundary 34 may provide the light reflective boundary for core and cladding fiber optics. In some embodiments, first material 16, second material 18, and core 40 may comprise different light refracting properties. Accordingly, core 40 may be approximately 8-10 micrometers in diameter, providing a single-mode fiber. Similarly, or alternatively, first material 16 may be larger and provide multi-mode fiber optics. As such, in some embodiments, boundary 34 may be a transition between a first refracting material and a second refracting material, causing light to remain in core 40 and/or first material 16, providing single- and multi-mode fiber optics. As such, fiber 32 may be a fiber optic and may be combined with various other fiber optics to create a fiber optic cable capable of transmitting light communications.

Figure 2C:
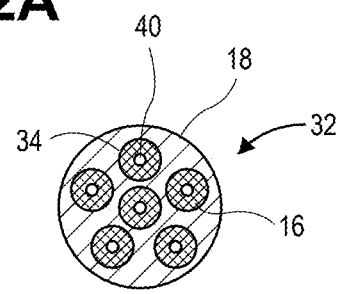

FIG. 2C depicts an embodiment of fiber 32 comprising a plurality of regions comprising first material 16 heated and drawn within second material 18. Furthermore, each region comprises core 40. Here, first material 16, second material 18, and core 40 may be any combination of core and cladding for providing fiber optics as described above. Alternatively, fiber 32 of FIG. 2C may comprise various regions comprising one or more instances of core 40 for hermetic seal 50. Here, core 40 may be a through hole spanning the length of fiber 32. As such, as shown in FIG. 2G insert 54 may be inserted through the hole. In some embodiments, insert 54 may be conductors, tubes, or any other form of insert that may be useful for various applications. Furthermore, insert 54 may comprise metal, plastic, rubber, or any other material suitable for its intended purpose.

Figure 2D:
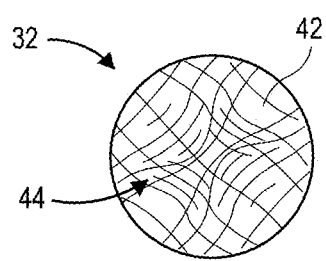
FIGS. 2D-2F depict fiber cross-sections comprising stress gradients.

FIG. 2D depicts an embodiment of fiber 32 comprising a stress gradient 44. In some embodiments, it may be beneficial to provide a lateral functional gradient of properties throughout the cross-section of fiber 32. Intermediate material 42 may comprise various properties that may have been generated in preprocessing. Intermediate material 42 may provide a stress gradient gradually changing from the CTE of first material 16 to the CTE of second material 18 and/or vice versa. In some embodiments, intermediate material comprises a CTE between a first material CTE and a second material CTE such that the stress gradient 44 is minimal.

Figure 2E:
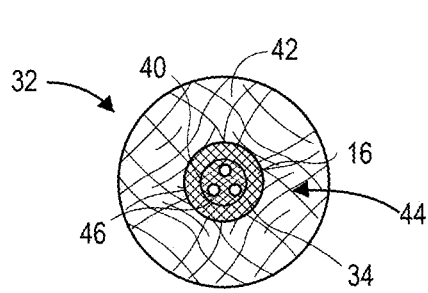

FIG. 2E depicts an embodiment of fiber 32 cross section comprising intermediate material 42, first material 16, and a plurality of cores 40. First material 16 may be drawn within intermediate material 42. In some embodiments, first material 16 may be drawn within second material 18. Second material 18 may then be modified as described above to create intermediate material 42. In some embodiments, intermediate material 42 comprises changing properties from an outside edge of fiber 32 to first material 16. For example, at the outer edge, intermediate material 42 may comprise a CTE matching, or similar to, a CTE of a material to be added to the outside of fiber 32 (e.g., exterior material 52, FIG. 2G). As intermediate material closely matches the CTE of exterior material 52 on the outside and third material 46, or first material 16, on the inside, seal 50 may be heated/cooled while minimizing expansion/contraction stresses across fiber 32.

In some embodiments, core 40 may be provided in first material 16. As described above, first material 16 may be a material closely matching the CTE of a material to be inserted into core 40 (e.g., insert 54, FIG. 2G) or, as shown in FIG. 2E third material 46. Here, first material 16 may comprise an intermediate CTE providing a stress buffer between third material 46 and intermediate material 42. For example, a difference between the edge of intermediate material 42 near first material 16 may provide a difference in CTE of $5 \times 10^{-6}$ per degree Celsius. A CTE difference between first material 16 and third material 46 may be $7 \times 10^{-6}$ per degree Celsius. Therefore, requiring a CTE difference between materials of $6 \times 10^{-6}$-$10 \times 10^{-6}$ per degree Celsius in this particular example results in a difference of $12 \times 10^{-6}$ per degree Celsius between intermediate material 42 and third material 46; outside of the desired range. As such, first material 16 can be added as a buffer between intermediate material 42 and third material 46.

It should also be noted, that applying first material 16 between intermediate material 42 and third material 46 is exemplary. A buffer material or a plurality of buffer materials may be provided between any first material, second material, third material, gradient material, or any other material described herein to provide steps of CTE to reduce the forces between each material of fiber 32. Therefore, seal 50 may be heated/cooled while minimizing expansion/contraction stresses across various portions of fiber 32.

Figure 2F:
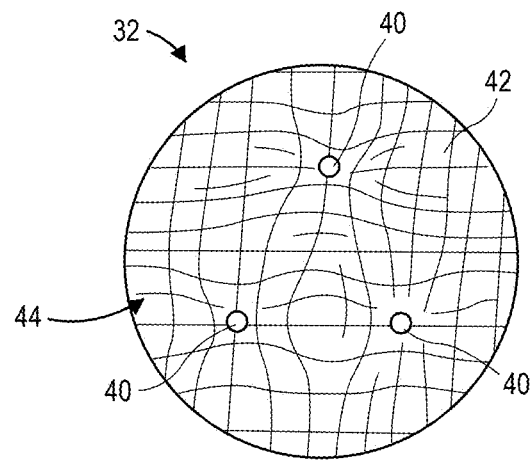
Figure 2G:
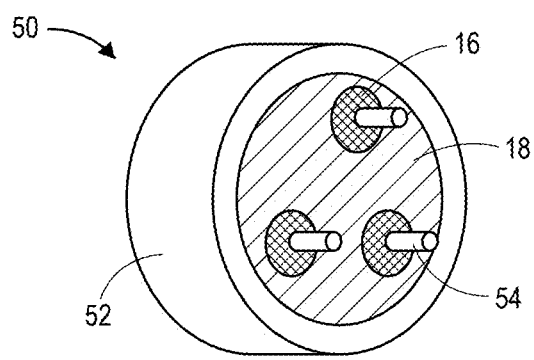
FIG. 2G depicts an exemplary seal formed by the processes of the disclosure.

FIG. 2F depicts an exemplary embodiment of fiber 32 comprising intermediate material 42 comprising stress gradient 44. Here, intermediate material 42 extends from an outer edge to core 40; here, comprising a plurality of cores. As shown, intermediate material 42 may be bonded to exterior material 52 at the outer edge and be bonded to inserts 54 at the plurality of cores. As described herein, intermediate material 42 may be designed to provide a similar CTE to exterior material 52 near exterior material and provide a similar CTE to insert 54 near core 40 providing insert 54. Here, the CTE of intermediate material is between the CTE of exterior material 52 and core 40 (or a material that is positioned in core 40). As such, the forces as shown by as gradient 44 across fiber 32 may be minimized.

FIG. 2G depicts an exemplary embodiment of hermetic seal 50 comprising first material 16 and second material 18. Various materials and/or material properties, as shown in FIGS. 2A-2F, may be useful in various scenarios when implemented in hermetic seals. For example, when heat exchange occurs in hermetic seal 50, the different CTE in first material 16 and second material 18 may generate forces on exterior material 52 and insert 54, or a material (not shown) between insert 54 and first material 16, causing all components in hermetic seal 50 to be in equilibrium. As a substance is passed from one side of hermetic seal 50 to the other through insert 54 (e.g., a tube), a thermal gradient may form across hermetic seal 50. Providing a different CTE surrounding insert 54 than against exterior material 52 may effectively limit or nullify any forces (or a sum of the forces) that may develop due to the thermal gradient. This may decrease the risk of breakage and extend the life of hermetic seal 50 and its components. As described above, intermediate material 42 may be provided between insert 54 and exterior material 52 and between any other materials closely matching CTE (providing similar CTE) between materials further reducing the functional stress across fiber 32. As described above, a "similar" CTE may be within a range of $6 \times 10^{-6}$-$10 \times 10^{-6}$ per degree Celsius; however, this range is exemplary and may be any range that reduces thermal stress across fiber 32 in the arrangements shown and described herein.

Though it is described that the CTE may be utilized to nullify forces, it can be imagined that specific forces may be generated by the CTE of various materials in hermetic seal 50. For example, as thermal changes take place in the environment surrounding hermetic seal 50, pressure may build on one side of hermetic seal 50, or a pressure difference may exist on each side of hermetic seal 50. Exterior material 52 may be a material such as metal, ceramic, or composite and, as second material 18 expands, forces may build in exterior material 52, pressing and preventing hermetic seal 50 from popping out of the container. Furthermore, insert 54 may be a /metal/glass/composite/ceramic pin providing a substance to the interior of a container sealed by hermetic seal 50. As second material 18 expands, first material 16 may shrink, stay the same, or expand less, compensating for the expansion of second material 18 and preventing insert 54 from collapsing and cutting off the flow of the substance to the interior of the container.

In some embodiments, insert 54 may be a conductor. Hermetic seal 50 may be used with electronics to provide airtight and/or watertight seals while allowing for conductive pathways. First material 16 and second material 18 may provide watertight/airtight material properties combined with the CTE and force properties of fiber 32 described above. As such, any of the above-described configurations of fiber 32 may be used in the electronics field, optics, and any other field of use when insert 54 is a conductor. These exemplary uses are not limiting and any industrial use for the various properties of first material 16, second material 18, and intermediate material 42 in fiber 32 can be imagined.

Figure 3A:
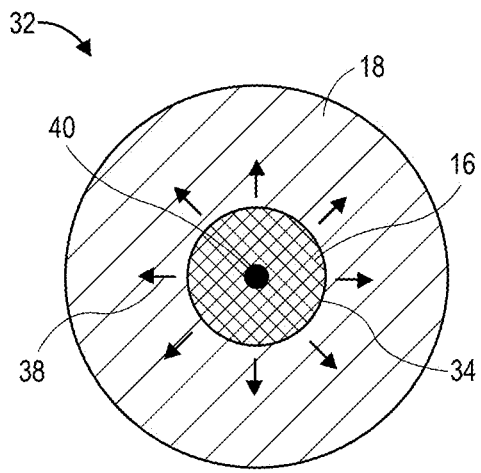
FIGS. 3A-3C depict exemplary forces provided in the fiber.
Figure 3B:
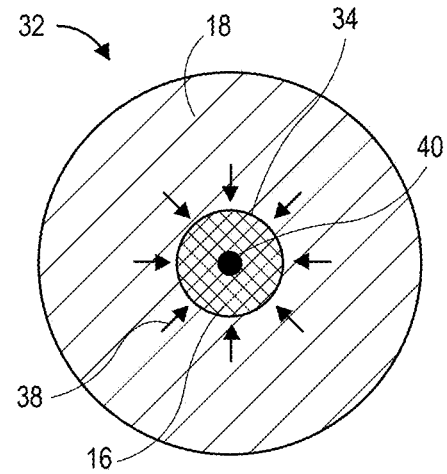
Figure 3C:
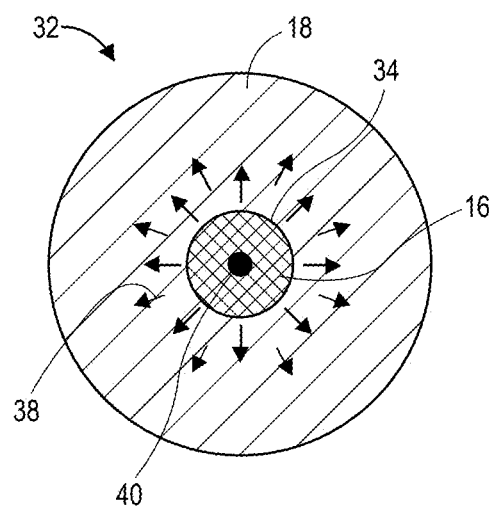

Turning now to embodiments of fiber 32 depicted in FIGS. 3A-3C where forces are considered throughout the thickness of fiber 32 and are depicted by arrows 38. Here, FIGS. 3A-3C depict cross-section views of fiber 32 with internal forces. However, as described above, first material 16 and second material 18 may be utilized to create forces within the materials and/or on interior and exterior materials that may be added to fiber 32. In some embodiments, interior and exterior additional materials (e.g., exterior material 52 and core 40) may be metal, ceramic, composite, and the forces may be generated by changes in temperature. The forces may act to compress the materials to create tighter seals or may be generated to maintain equal forces throughout hermetic seal 50 to prevent breaking. Here, FIGS. 3A-3B depict exemplary forces that may be provided by the interaction between first material 16 and second material 18. FIG. 3C depicts an exemplary force, which may be stress gradient 44 or caused by stress gradient 44 described above. Similarly, or alternatively, it can be imagined that forces may be generated between first material 16, second material 18, intermediate material 42, exterior material 52, insert 54, and any other material that may be provided in contact with any portion of fiber 32. Furthermore, as FIGS. 3A-3C are depicting exemplary forces based on the materials described above, any arrangement of the materials shown in FIGS. 2A-2G may generate forces throughout fiber 32. Furthermore, it can be imagined that the compressive and tensile forces on the various materials may be provided by stress gradient 44 in adjoining materials as described above.

Figure 4:
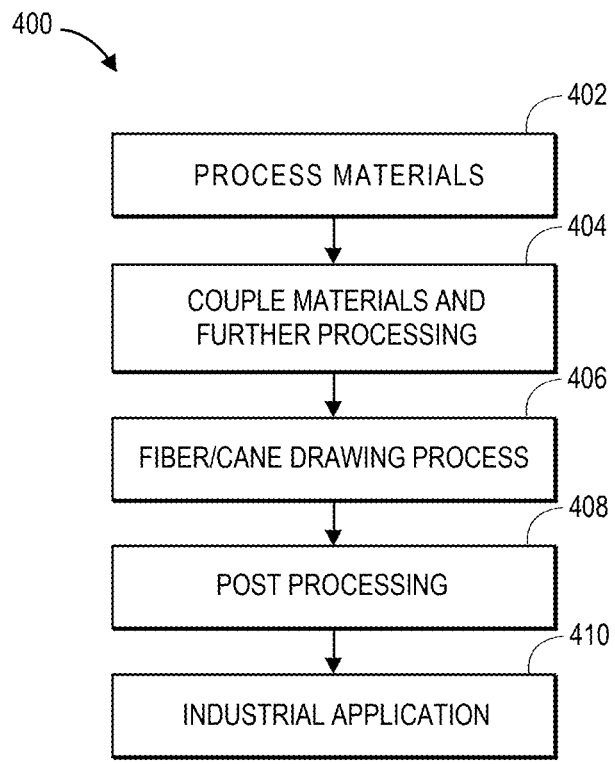
FIG. 4 depicts an exemplary flow diagram illustrating a process of creating glass and ceramic glass fibers and forming seals.

FIG. 4 depicts a flow diagram depicting an exemplary process for creating fiber 32 and implementing fiber 32 in various industries, the process generally referenced by the numeral 400. At step 402, the various materials described herein may be processed. The material used in the process described herein and forming first material 16, second material 18, and intermediate material 42 can be any of typical glass, glass ceramic, and/or ceramic materials such as, for example, alumino-borosilicate glass, A-glass (alkali-lime glass, little-to-no boron), E-CR-glass (Electrical/Chemical Resistance), C-glass (alkali-lime with high boron content), borosilicate glass, and any other silica-based formulation. Similarly, ceramics of any formulation may be used in the cane-pulling process. It should be noted that, though glass is generally referenced as the material in examples herein, ceramics, metals, composites, and any other material that may be processed in drawing system 10 may be compatible with the processes described herein.

Furthermore, the materials may be processed in any way to generate the various properties described above. For example, different conductive, strength, thermal, chemical properties, and the like may be generated in first material 16, second material 18, and intermediate material 42. In some embodiments, first material 16 and second material 18 may comprise the same formula but may be processed mechanically. As such, various properties and stresses may be included in fiber 32 once first material 16 and second material 18 are fused and, in some embodiments intermediate material 42 is generated.

At step 404, the various materials may be mechanically combined to create a preform that may be drawn. First material 16, configured as a rod in the exemplary embodiment of FIG. 1, may be inserted into second material 18, configured as a tube. This process may create preform 12 where the rod and the tube are mechanically coupled such that further processing may begin. In some embodiments, preform 12 may be mechanically coupled and then undergo additional processing (e.g., processing in step 402) to produce other configurations of fiber 32 shown in FIGS. 2A-2E. Though mechanical coupling is described herein, it is not necessary. In some embodiments, the tube may be inserted into the rod and not coupled. Tube and rod may then be fed into furnace 20 where first material 16 and second material 18 melt together and fuse as drawn as described in embodiments herein.

At step 406, the drawing process may be performed by drawing system 10 (FIG. 1) to generate fiber 32 from first material 16 configured as the rod and second material 18 configured as the tube. The coupled rod and tube may be heated by furnace 20 to a melting point, then pressured and pulled into fiber 32 as described above. The resulting fiber, fiber 32, may comprise first material 16 and second material 18 fused into fiber 32. First material 16 and second material 18 may include different properties that may be beneficial in various industries and may comprise any cross sections shown in FIGS. 2A-3C, though many more may be imagined.

At step 408, fiber 32 may undergo post-processing for the use case. For example, fiber 32 may be cut for use in hermetic seals and/or combined for use in fiber optics. In some embodiments, a reflective or light absorptive, a hydrophilic or hydrophobic, and a conductive or non-conductive coating may be added. In some embodiments, additional materials may be added, such as core 40, insert 54, and exterior material 52, as described above. In some embodiments, fiber 32 may be prepared for use in various industries including as hermetic seal 50 in electronics and fiber optics.

At step 410, fiber 32 may be implemented in the field or industry for which it was created. Implementation in the field may result in introduction to the working environment (and working temperatures) described above. Fiber 32 may be introduced to various temperatures and conditions that activate the effects of the different properties of first material 16 and second material 18 in fiber 32. For example, the working temperature may be, for example, room temperature. At room temperature, stress is generated in fiber 32 by differing CTE of first material 16 and second material 18. This stress may counteract stresses provided by exterior forces introduced to fiber 32. For example, fiber 32 may be used in hermetic seal 50. As temperature and pressure increase in a container sealed by hermetic seal 50, second material 18 may expand to produce a more airtight and solid seal against exterior material 52. Furthermore, in some embodiments, first material 16 may expend/retract at a much lower rate ensuring that insert 54 is not collapsed and may be free to allow substances to pass through.

In some embodiments, fiber 32 may be used in optics, and core 40, first material 16, and second material 18 may comprise different refractive properties. As such, fiber 32 may be a first- or multi-mode fiber optic. Furthermore, the various differences in properties and CTE may allow efficient light transmission properties throughout a wide range of temperatures. Though hermetic seals and fiber optics are discussed as possible industrial uses for fiber 32, it can be imagined that fiber 32 may be useful in many other industries, including electrical seals, chemical seals, and the like.

In some aspects, the techniques described herein relate to a method of creating a fused material with a coefficient of thermal expansion (CTE) functional gradient.

In some aspects, the method includes providing a first material and a second material, wherein the first material includes a first coefficient of thermal expansion (CTE) and the second material includes a second CTE and the first CTE is distinct from the second CTE.

In some aspects the method includes adding heat to the first material and the second material to fuse the first material to the second material and drawing the first material and the second material into the fused material, wherein the fused material includes a first portion includes a first portion CTE, and a second portion includes a second portion CTE.

In some aspects, the techniques described herein relate to a method, wherein the fused material includes a third portion providing a third CTE between the first portion CTE and the second portion CTE.

In some aspects, the techniques described herein relate to a method, wherein the first portion CTE and the second portion CTE differ in a range of $6\times10^{-6}$-$10\times10^{-6}$ per degree Celsius.

In some aspects, the techniques described herein relate to a method, further including generating internal stress in the fused material by adding additional heat to or cooling the fused material.

In some aspects, the techniques described herein relate to a method, further including generating or relieving internal forces in the first material and the second material prior to forming the fused material.

In some aspects, the techniques described herein relate to a method, wherein the internal forces in the first material and the second material are generated or relieved by tempering or annealing.

In some aspects, the techniques described herein relate to a method, wherein a first material geometry is a rod, and a second material geometry is a tube, and the method further includes inserting the rod into the tube.

In some aspects, the techniques described herein relate to a method, further including cleaning and smoothing a surface of the fused material during cooling of the fused material after fusing the first material to the second material.

In some aspects, the techniques described herein relate to a method, wherein the fused material is drawn into a cane or a fiber.

In some aspects, the techniques described herein relate to a method of creating a fused material with a coefficient of thermal expansion (CTE) functional gradient, the method including: providing a first material and a second material, wherein the first material includes a first CTE and the second material includes a second CTE and the first CTE is distinct from the second CTE, wherein a first material geometry is a rod, and a second material geometry is a tube, and the method further includes inserting the rod into the tube; adding heat to the first material and the second material to fuse the first material to the second material; drawing the first material and the second material into the fused material including a cane or a fiber, wherein the fused material includes a first portion including a first portion CTE, and a second portion including a second portion CTE.

In some aspects, the techniques described herein relate to a method, further including forming at least one hole in the first portion.

In some aspects, the techniques described herein relate to a method, further including inserting at least one metal tube into the at least one hole, wherein a metal CTE of the at least one metal tube is similar to the first portion CTE.

In some aspects, the techniques described herein relate to a method, wherein the at least one metal tube is a first metal tube and the metal CTE is a first metal CTE, and wherein the method further includes: inserting the fused material into a second metal tube including a second metal CTE, wherein the second metal CTE is similar to the second portion CTE; and bonding the first portion to the first metal tube and bonding the second portion to the second metal tube.

In some aspects, the techniques described herein relate to a method, wherein the first material and the second material include glass, ceramic, or glass ceramic.

In some aspects, the techniques described herein relate to a method of creating a fused material with a coefficient of thermal expansion (CTE) functional gradient, the method including: providing a first material and a second material, wherein the first material and the second material include a glass, a ceramic, or a glass ceramic, wherein the first material includes a first CTE and the second material includes a second CTE and the first CTE is distinct from the second CTE; adding heat to the first material and the second material to fuse the first material to the second material; and drawing the first material and the second material into the fused material, wherein the fused material includes a first portion including a first portion CTE based on the first CTE, a second portion including a second portion CTE based on the second CTE.

In some aspects, the techniques described herein relate to a method, wherein a geometry of the fused material is a cane or a fiber.

In some aspects, the techniques described herein relate to a method, further including: providing one or more holes in the first portion of the fused material; inserting one or more first tubes into the one or more holes; and bonding the one or more first tubes to the first portion.

In some aspects, the techniques described herein relate to a method, wherein the one or more first tubes are metal; and wherein the first portion CTE is based on a metal CTE of the one or more first tubes.

In some aspects, the techniques described herein relate to a method, wherein a first material geometry is a rod, and a second material geometry is a tube, and the method further includes inserting the rod into the tube.

In some aspects, the techniques described herein relate to a method, wherein the one or more holes are provided in the first portion by drilling after the first material and the second material are drawn into the fused material.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

The invention claimed is:

1. A method of creating a fused material with a coefficient of thermal expansion (CTE) functional gradient, the method comprising:
   providing a first material and a second material,
   wherein the first material comprises a first coefficient of thermal expansion (CTE) and the second material comprises a second CTE and the first CTE is distinct from the second CTE;
   adding heat to the first material and the second material to fuse the first material to the second material and drawing the first material and the second material into the fused material,
   wherein the fused material comprises a first portion comprising a first portion CTE, and a second portion comprising a second portion CTE;
   providing one or more holes in the fused material; and
   providing one or more tubes in the one or more holes.

2. The method of claim 1, wherein the fused material comprises a third portion providing a third CTE between the first portion CTE and the second portion CTE.

3. The method of claim 1, wherein the first portion CTE and the second portion CTE differ in a range of $6\times10^{-6}$ to $10\times10^{-6}$ per degree Celsius.

4. The method of claim 1, further comprising generating internal stress in the fused material by adding additional heat to or cooling the fused material.

5. The method of claim 1, further comprising generating or relieving internal forces in the first material and the second material prior to forming the fused material.

6. The method of claim 5, wherein the internal forces in the first material and the second material are generated or relieved by tempering or annealing.

7. The method of claim 1, wherein a first material geometry is a rod, and a second material geometry is a tube, and the method further comprises inserting the rod into the tube.

8. The method of claim 1, further comprising cleaning and smoothing a surface of the fused material after fusing the first material to the second material.

9. The method of claim 1, wherein the fused material is drawn into a cane or a fiber.

10. The method of claim 1, wherein the method further comprises bonding the one or more tubes in the one or more holes.

11. The method of claim 10, wherein the one or more tubes comprise a tube material comprising metal, plastic, ceramic, glass, or glass ceramic.

12. The method of claim 11,
wherein the one or more tubes are provided in the second portion,
wherein the second portion CTE matches a tube CTE.

13. A method of creating a fused material with a coefficient of thermal expansion (CTE) functional gradient, the method comprising:
providing a first material and a second material,
wherein the first material comprises a first CTE and the second material comprises a second CTE and the first CTE is distinct from the second CTE,
wherein a first material geometry is a rod, and a second material geometry is a tube, and the method further comprises inserting the rod into the tube;
adding heat to the first material and the second material to fuse the first material to the second material;
drawing the first material and the second material into the fused material comprising a cane or a fiber,
wherein the fused material comprises a first portion comprising a first portion CTE, and a second portion comprising a second portion CTE;
forming at least one hole in the first portion; and
inserting at least one metal tube into the at least one hole, wherein a metal CTE of the at least one metal tube is similar to the first portion CTE.

14. The method of claim 13,
wherein the at least one metal tube is a first metal tube and the metal CTE is a first metal CTE, and
wherein the method further comprises:
inserting the fused material into a second metal tube comprising a second metal CTE,
wherein the second metal CTE is similar to the second portion CTE; and
bonding the first portion to the first metal tube and bonding the second portion to the second metal tube.

15. The method of claim 13, wherein the first material and the second material comprise glass, ceramic, or glass ceramic.

16. A method of creating a fused material with a coefficient of thermal expansion (CTE) functional gradient, the method comprising:
providing a first material and a second material,
wherein the first material and the second material comprise a glass, a ceramic, or a glass ceramic,
wherein the first material comprises a first CTE and the second material comprises a second CTE and the first CTE is distinct from the second CTE;
adding heat to the first material and the second material to fuse the first material to the second material;
drawing the first material and the second material into the fused material,
wherein the fused material comprises a first portion comprising a first portion CTE based on the first CTE, a second portion comprising a second portion CTE based on the second CTE;
providing one or more holes in the first portion of the fused material;
inserting one or more tubes into the one or more holes; and
bonding the one or more tubes to the first portion.

17. The method of claim 16, wherein a geometry of the fused material is a cane or a fiber.

18. The method of claim 16,
wherein the one or more tubes are metal; and
wherein the first portion CTE is based on a metal CTE of the one or more tubes.

19. The method of claim 16, wherein a first material geometry is a rod, and a second material geometry is a material tube, and the method further comprises inserting the rod into the material tube.

20. The method of claim 16, wherein the one or more holes are provided in the first portion by drilling after the first material and the second material are drawn into the fused material.

* * * * *